US012227984B2

(12) United States Patent
Kim

(10) Patent No.: US 12,227,984 B2
(45) Date of Patent: Feb. 18, 2025

(54) PANIC DEVICE WITH DOOR CLOSER

(71) Applicant: YESUNG GLOBAL CO., LTD., Daegu-si (KR)

(72) Inventor: Kyung Tae Kim, Daegu-si (KR)

( * ) Notice: Subject to any disclaimer, the term of this patent is extended or adjusted under 35 U.S.C. 154(b) by 244 days.

(21) Appl. No.: 18/086,929

(22) Filed: Dec. 22, 2022

(65) Prior Publication Data

US 2023/0220714 A1 Jul. 13, 2023

(30) Foreign Application Priority Data

Jan. 11, 2022 (KR) ........................ 10-2022-0004198

(51) Int. Cl.
*E05F 3/02* (2006.01)
*E05B 65/10* (2006.01)
*E05F 1/10* (2006.01)

(52) U.S. Cl.
CPC ............ *E05F 3/02* (2013.01); *E05B 65/1053* (2013.01); *E05F 1/105* (2013.01); *E05Y 2201/256* (2013.01); *E05Y 2201/264* (2013.01); *E05Y 2201/474* (2013.01); *E05Y 2900/134* (2013.01)

(58) Field of Classification Search
CPC ..... E05F 3/02; E05F 3/20; E05F 1/105; E05F 1/1091; B05B 65/1053; B05B 65/1046; B05B 65/1066; B05B 65/1073; E05Y 2201/256; E05Y 2201/264; E05Y 2201/474; E05Y 2900/134
See application file for complete search history.

(56) References Cited

U.S. PATENT DOCUMENTS

| | | | | |
|---|---|---|---|---|
| 1,962,291 A * | 6/1934 | Anderson | E05F 3/00 | 16/49 |
| 3,372,427 A * | 3/1968 | Koivusalo | E05F 3/108 | 16/68 |
| 3,408,683 A * | 11/1968 | Zahn | F16F 9/08 | 16/65 |
| 4,102,006 A * | 7/1978 | Jenkins | E05F 3/108 | 16/66 |

(Continued)

FOREIGN PATENT DOCUMENTS

| | | | |
|---|---|---|---|
| DE | 102011006524 A1 * | 10/2012 | E05F 1/105 |
| FR | 1587528 A | 3/1970 | |

(Continued)

OTHER PUBLICATIONS

English Specification of 10-2020-0066859.

(Continued)

*Primary Examiner* — Chuck Y Mah
(74) *Attorney, Agent, or Firm* — ANTONIO HA & U.S. PATENT, LLC

(57) ABSTRACT

Disclosed is a panic bar with a door closer, the panic bar having a locking device installed at a front end of a case and a door closer provided at a rear end of the case. The locking device is released upon pushing of the push bar provided in the case. An air cylinder is installed inside the case. A guide member is installed in one side of the air cylinder and a cylinder sealing cap is installed in the other side of the air cylinder. One side of a piston rod having a piston for compressing and expanding air inside the air cylinder passes through the guide member. A spring disposed between the piston and the guide member is installed on the piston rod.

5 Claims, 12 Drawing Sheets

(56) References Cited

U.S. PATENT DOCUMENTS

| | | | | | |
|---|---|---|---|---|---|
| 4,839,988 | A * | 6/1989 | Betts | E05B 65/1013 | 49/141 |
| 4,920,609 | A * | 5/1990 | Lin | E05F 3/221 | 188/300 |
| 5,170,530 | A * | 12/1992 | Kopec | E05F 3/108 | 188/316 |
| 5,956,806 | A * | 9/1999 | Tutikawa | E05F 3/02 | 16/49 |
| 8,051,534 | B1 | 11/2011 | Luca | | |
| 9,169,905 | B1 * | 10/2015 | Morris | E05F 5/00 | |
| 11,215,001 | B2 * | 1/2022 | Cai | E05F 3/104 | |
| 2008/0189906 | A1 * | 8/2008 | Resnik | E05F 3/108 | 16/54 |
| 2009/0241287 | A1 * | 10/2009 | Reid | F16F 9/585 | 16/58 |
| 2017/0081892 | A1 * | 3/2017 | Fan | E05F 3/10 | |
| 2020/0123828 | A1 * | 4/2020 | Reid | E05F 1/105 | |

FOREIGN PATENT DOCUMENTS

| | | |
|---|---|---|
| KR | 10-0874595 | 12/2008 |
| KR | 10-2020-0066859 | 6/2020 |
| KR | 10-2020-0066863 | 6/2020 |
| KR | 10-2021-0042651 | 4/2021 |

OTHER PUBLICATIONS

English Specification of 10-0874595.
English Specification of 10-2020-0066863.
English Specification of FR 1587528A.
English Specification of 10-2021-0042651.

* cited by examiner

PANIC DEVICE WITH DOOR CLOSER

CROSS-REFERENCE TO RELATED APPLICATIONS

This application claims priority to Korean Patent Application No. 10-2022-0004198 filed in the Korean Intellectual Property Office on Jan. 11, 2022, the disclosure of which is incorporated by reference herein in its entirety.

TECHNICAL FIELD

The present disclosure relates to a panic device (hereinafter, referred to as a "panic bar") with a door closer, and more particularly, to a panic bar allowing a user to easily push a door to open and having a pneumatic door closer installed at a rear end of the panic bar so as to easily close the door.

DISCUSSION OF RELATED ART

In general, buildings such as hospitals, buildings, government offices, schools, hotels, and concert halls are partitioned with evacuation stairs, evacuation floors, or lobbies that communicate directly with the outside, and fire doors are installed in all of these fire divisions.

In addition, each fire door installed in such buildings is provided with an automatic door closing device (so-called "door closer") and a panic bar. The panic bar is installed on one side of the fire door to guide a direction to escape when a person pushes the panic bar and open the fire door. Accordingly, in the event of an emergency such as a disaster or fire, a person is able to open a fire door and promptly evacuate to evacuation stairs in the building.

For example, many technologies related to a panic bar has been developed and published, including Korean Patent Application No. 10-2007-0082715. Generally, such a panic bar includes: a base bar provided with a touch bar to be pressed-in/restored by a spring and installed at an inner side of a door; a door lock device coupled to one end of the base bar while being connected to the touch bar, and having a latch bolt corresponding to a strike of a door frame therein; and a door handle installed at an outer side of the door while being connected to the door lock device. In this panic bar, a door closer is not provided, but installed separately.

That is, the separately installed door closer is installed between a crossbar of the door frame and one side of the fire door and the panic bar is installed on the plane of the fire door at the height of the waist and chest of a human body. For this reason, it is not possible to install the panic bar and the door closer in parallel or in a straight line on the plane of the fire door at the height of the waist and chest of a human body.

In order to address this drawback, Korean Patent Application Publication No. 10-2018-0153500 has been developed, in which two spring pushers are installed to be movable in a longitudinal direction of a housing while facing each other inside the housing, a spring is installed between the pushers to elastically support the two spring pushers, a chain support for supporting a part of the chain is rotatably installed at each of the two spring pushers, one side end of the chain wrapping two spaced spring supports in a zig-zag fashion is installed at one side of the housing and the other side end of the chain is installed at a hinge member installed at a door frame, so that the chain, the two spring supports, and the spring pusher are moved according to opening of the door. Using this structure, it is possible to install a door closer at a rear end of the panic bar.

This related art includes a chain separation support between the chain and the door in order to prevent the door and the chain from coming into contact with each other when the door is opened. However, if the door is left open for a long time due to a user's negligence, a frictional force between the chain and the chain separation support may significantly reduce a closing force of the door due to corrosion of a contact area between the chain and the chain separation support exposed to the outside.

SUMMARY

The present disclosure provides a panic bar with a door closer, by which it is possible to prevent interference occurring at the event of opening of a door and to easily close a fire door even though one link or a plurality of links are connected between a hinge assembly and a door closer installed at a door frame.

The present disclosure also provides a panic bar which has a rod-shaped air flow control member so that a function of a door closer is easily improved by compression, expansion, a damping force, etc. of air in a space between an inner surface of an air cylinder and a front end surface of a piston according to a position of the piston inside the air cylinder.

In one aspect, there is provided a panic bar with a door closer, the panic bar having a locking device installed at a front end of a case and a door closer provided at a rear end of the case. The locking device is released upon pushing of the push bar provided in the case. An air cylinder is installed inside the case. A guide member is installed in one side of the air cylinder and a cylinder sealing cap is installed in the other side of the air cylinder. One side of a piston rod having a piston for compressing and expanding air inside the air cylinder passes through the guide member. A spring disposed between the piston and the guide member is installed on the piston rod. A main link hinge-coupled to one side of the piston rod is installed in the guide member. A hinge assembly having a main hinge hinge-coupled to the main link is inserted into and installed at a vertical bar of a door frame of a door. An inflow check valve for allowing external air to flow in one direction into the air cylinder is installed at the cylinder sealing cap. A pressure control valve for allowing air inside the air cylinder to flow to the outside in response to internal air pressure inside the air cylinder being at a predetermined pressure or higher is installed at the cylinder sealing cap.

Further, the piston rod may be hollow-shaped, an air flow control member passing through a central portion of the piston to be positioned in a hollow portion of the piston rod may be fixed to and installed at the cylinder sealing cap, a seal may be installed between an outer surface of the air flow control member and a through portion of the piston, and the air flow control member may come into close contact with an inner surface of the sealing according to an open angle of the door to block a flow of air and may also form a gap with the inner surface of the seal so that air flows or air acting as a damping force flows to an outside through the hollow portion of the piston rod from an inside of the air cylinder.

Further, one or more auxiliary links may be connected between the main link and the piston rod, each of the main link and the auxiliary link may be formed in a U-shape, and an inner side of each of the main link and the auxiliary link may be installed toward the door.

DESCRIPTION OF EXEMPLARY EMBODIMENTS

Hereinafter, embodiments of the present disclosure will be described in more detail based on the accompanying drawings.

Figure 12:
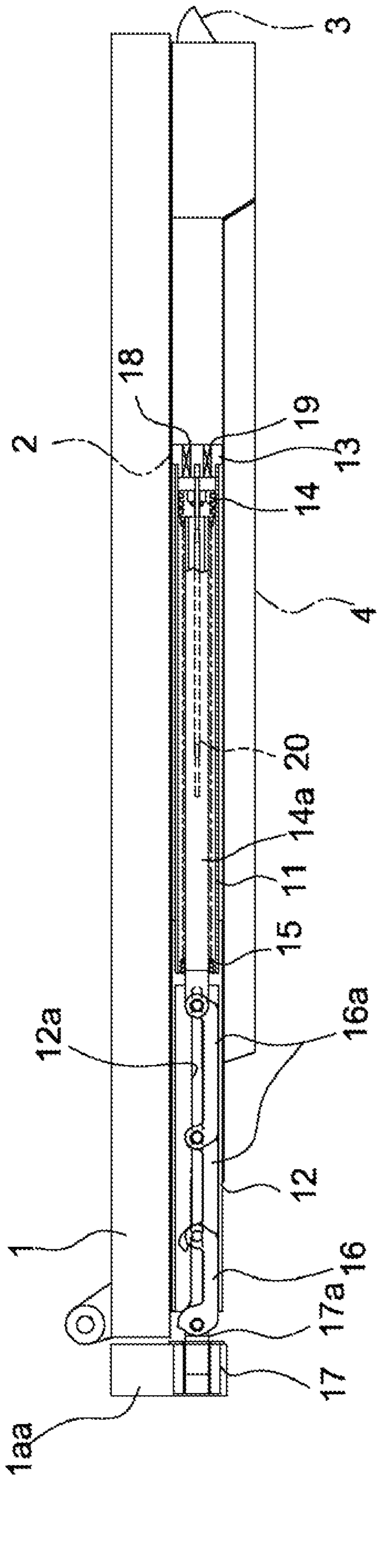
FIGS. 12 and 13 are cross-sectional views showing yet another example of a panic bar with a door closer according to the present disclosure.
Figure 13:
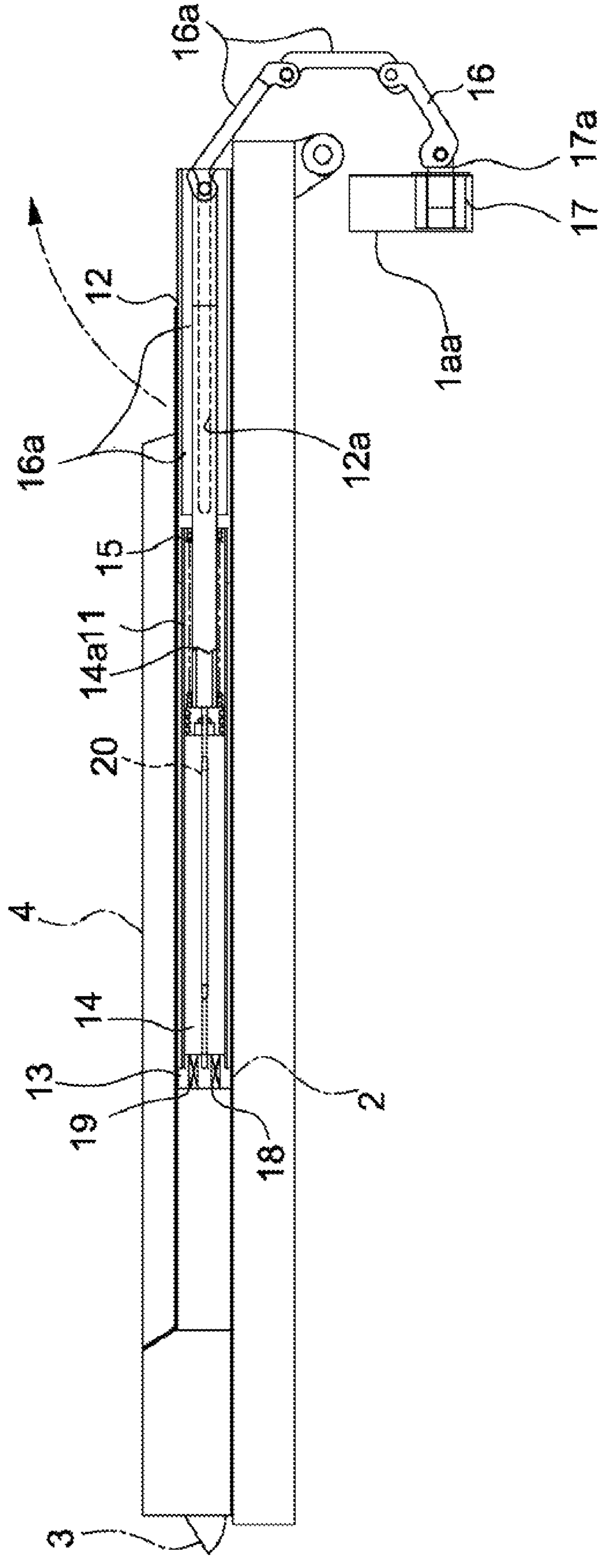

FIGS. 1 to 14 are views showing a panic bar with a door closer according to the present disclosure. Specifically, FIGS. 2 to 5 are views showing an example of a panic bar with a door closer according to the present disclosure, and FIGS. 6 to 11 are views showing another example of a panic bar with a door closer according to the present disclosure, and FIGS. 12 and 13 are views showing yet another example of a panic bar with a door closer according to the present disclosure.

In other words, one example of the panic bar with a door closer according to the present disclosure can be applied to a door that is capable of being opened at 90 degrees, and other examples of the present disclosure can be applied to a door that is capable of being opened 180 at degrees.

Figure 1:
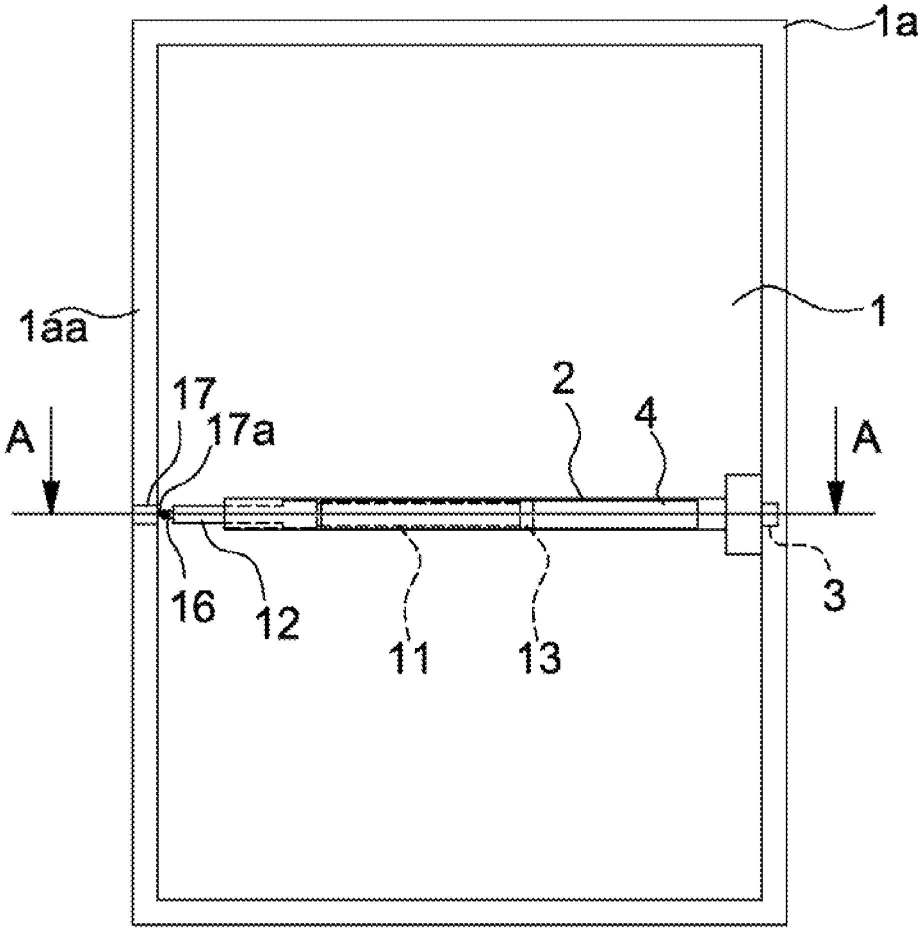
FIG. 1 is a front view showing a door to which a panic bar with a door closer function according to the present disclosure is applied.
Figure 2:
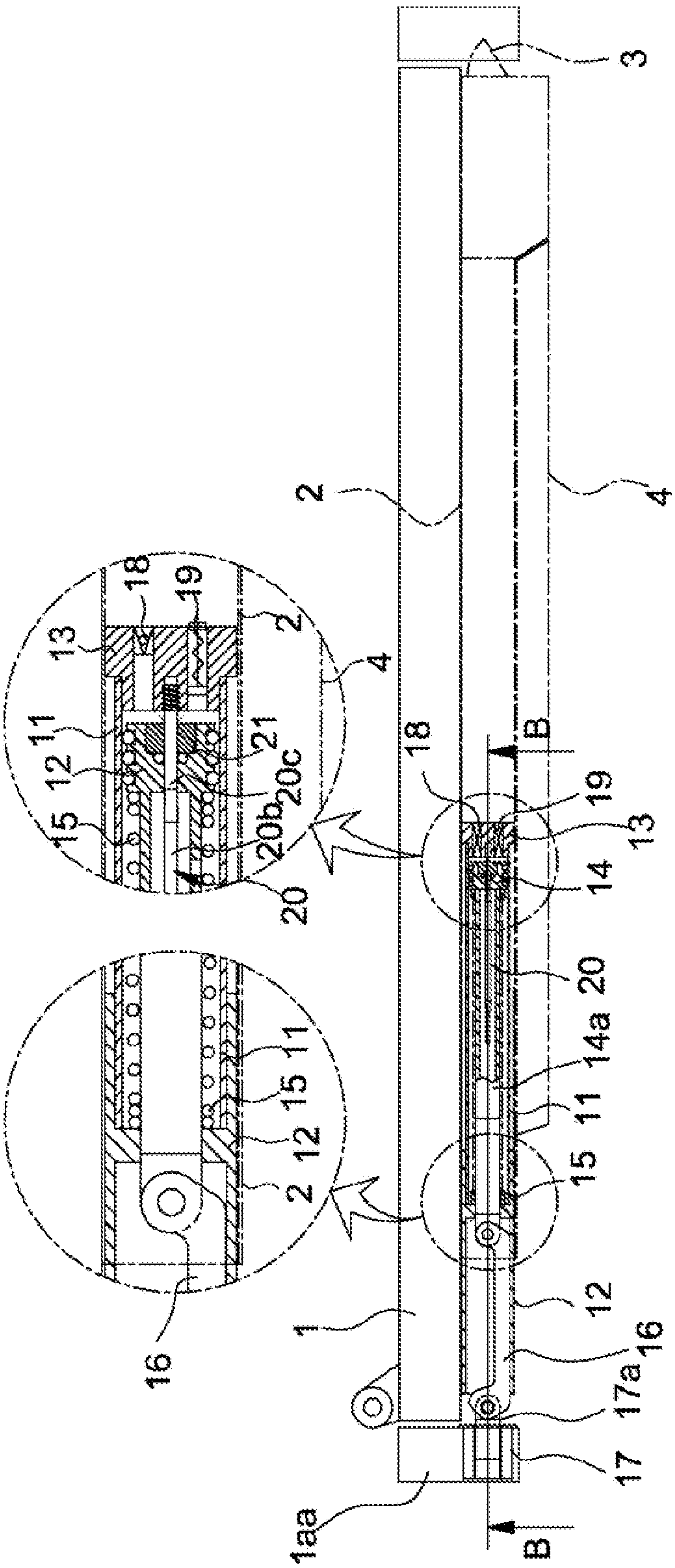
FIG. 2 is a cross-sectional view taken along line A-A of FIG. 1 showing an example of a panic bar with a door closer according to the present disclosure.
Figure 3:
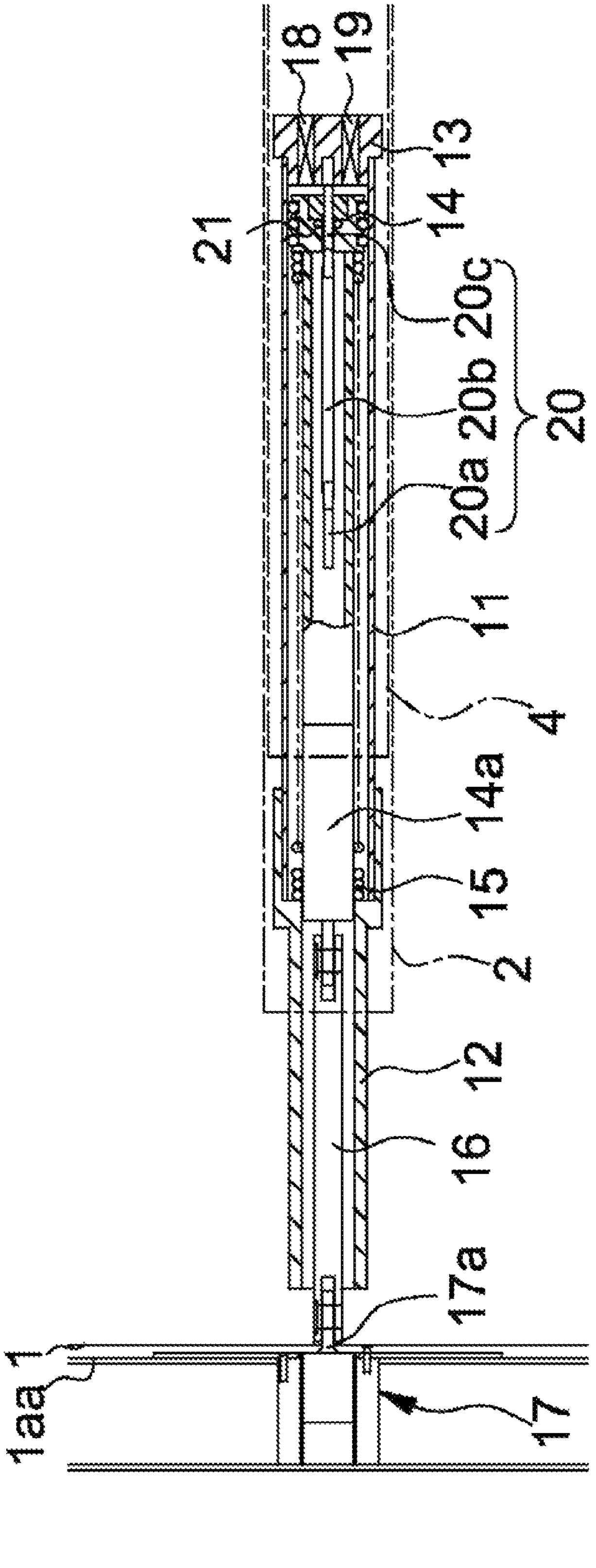
FIG. 3 is a cross-sectional view taken along line B-B of FIG. 2.

In one example, as shown in FIGS. 1 to 3, a panic bar according to the present disclosure is installed on one side of a door 1 at a height of about the waist and chest of a human body. A locking device 3 is installed at a front end of a case 2, and a door closer is provided at a rear end of the case 2 and installed on one side of the door 1. The locking device 3 is released by pushing a push bar 4 provided in the case 2, so the door 1 may be opened at the same time when the locking device 3 is released by pushing the push bar 4 provided in the panic bar. A detailed description of the function of the panic bar will be omitted since there are many technologies for which patents have been applied or registered, for example, Korean Patent Nos. 10-2019-0125469 and 10-2018-0115945, and well-known technologies can be applied.

In addition, in the present disclosure, a door closer is inserted and installed at the rear end of the case 2 of the panic bar. In this door closer, an air cylinder 11 is installed inside the case 2. A guide member 12 is installed at one side of the air cylinder 11, and a cylinder sealing cap 13 is installed at the other side of the air cylinder 11.

A piston 14 is inserted into and installed at the air cylinder 11, and a piston rod **14*a* is formed to protrude from one side of the piston 14. Thus, one side of the piston rod 14*a* included in the piston 14 to compress and expand the air in the air cylinder 11 linearly passes through the guide member 12**.

A spring 15 being extruded upon opening of the door 1 is interposed between the piston 14 and the guide member 12 and installed on the piston rod **14*a* so as to close the door 1** by an elastic force.

In addition, a main link 16 hinged to one side of the piston rod **14*a* is installed at the guide member 12, and a hinge assembly 17 provided with a main hinge 17*a* hinged to the main link 16 is inserted into and installed at a vertical bar 1*aa* of a door frame 1*a* of the door 1**.

An inflow check valve 18 for allowing external air to flow in one direction into the air cylinder 11 is installed at the cylinder sealing cap 13, and a pressure control valve 19 for allowing air inside the air cylinder 11 by air pressure inside the air cylinder 11 above a certain pressure is installed at the cylinder sealing cap 13.

Then, when the door 1 is opened, the main link 16 comes out of the guide member 12 while being rotated. In this course, the spring 15 is compressed as the piston 14 and the piston rod **14*a* are linearly moved. Due to the movement of the piston 14, a space between a front end surface of the piston 14 and an inner surface of the air cylinder expands. Since as vacuum pressure is formed in this space, external air flows in through the inflow check valve 18. If the door 1 is left open, as the piston 14 and the piston rod 14*a* are moved by an elastic force of the compressed spring 15. As a result, the main link 16** returns back to its initial state and thus door is closed.

Here, due to a pressure difference required to open and close the inflow check valve 18, vacuum pressure may be formed in the space between the front end surface of the piston and the inner surface of the air cylinder when the door is fully opened. When the door 1 is closed by an elastic force of the pressure control valve 19, a constant pressure is formed in the space between the front end surface of the piston and the inner surface of the air cylinder, and thus, a greater spring elastic force may be required to completely close the door.

Therefore, in the present disclosure, when the door is completely opened and closed, an atmospheric pressure needs to be formed in a space between the front end surface of the door piston and the inner surface of the air cylinder. In the present disclosure, the piston rod **14*a* is hollow-shaped to communicate with external air, an air flow control member 20 passing through a central portion of the piston 14 to be positioned in the hollow portion of the piston rod 14*a* is fixed to and installed at the cylinder sealing cap 13, and a seal 21 is installed between an outer surface of the air flow control member 20 and a through-portion of the piston 14**.

That is, the air flow control member not just adheres closely to the inner surface of the seal 21 according to an open angle of the door 1 to block an air flow, but also forms a gap with the inner surface of the seal 21 to circulate air or allows air, which acting as a damping force, to flow from an inside to an outside of the air cylinder 11 via a hollow portion of the piston rod **14*a***.

In other words, an air inlet part **20*a* may be formed at a front end of the air flow control member 20 so that air flows through an inside of the air cylinder 11 between the inner surface of the seal 21 and the air inlet part 20***a* when the door 1 is fully opened, an air compression part 20*b* to be brought into contact closely with the inner surface of the seal 21 may be formed in a middle of the air flow control member 20 so as to block an air flow, flowing to the hollow portion of the piston rod 14*a*, until the door is closed, and a damping part 20*c* may be formed at a rear end of the air flow control member 20 so that air subtly flows between the seal 21 and the damping part 20*c* before the door 1 is closed, thereby forming a damping force of the air.

Figure 4:
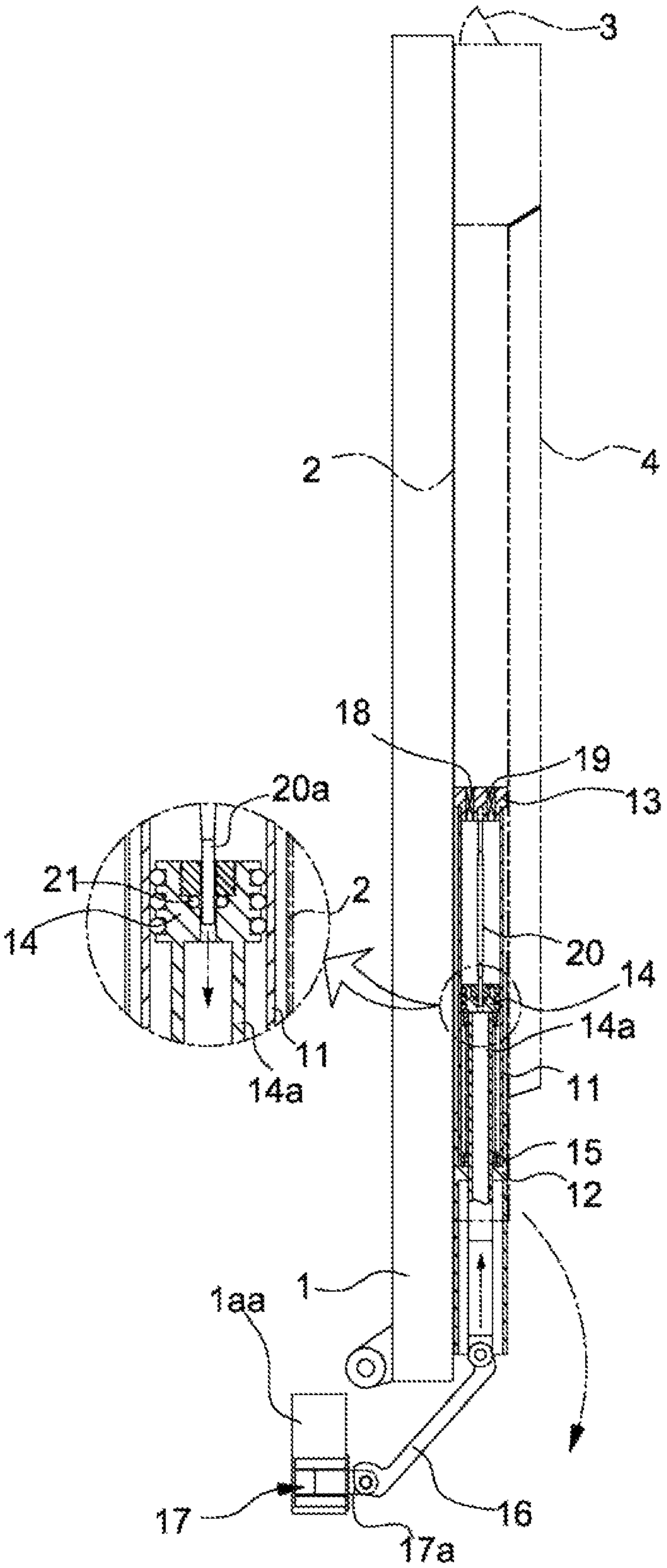
FIG. 4 is a cross-sectional view showing a state in which a door is opened at 90 degrees to which an example of a panic bar with a door closer according to the present disclosure is applied.
Figure 5:
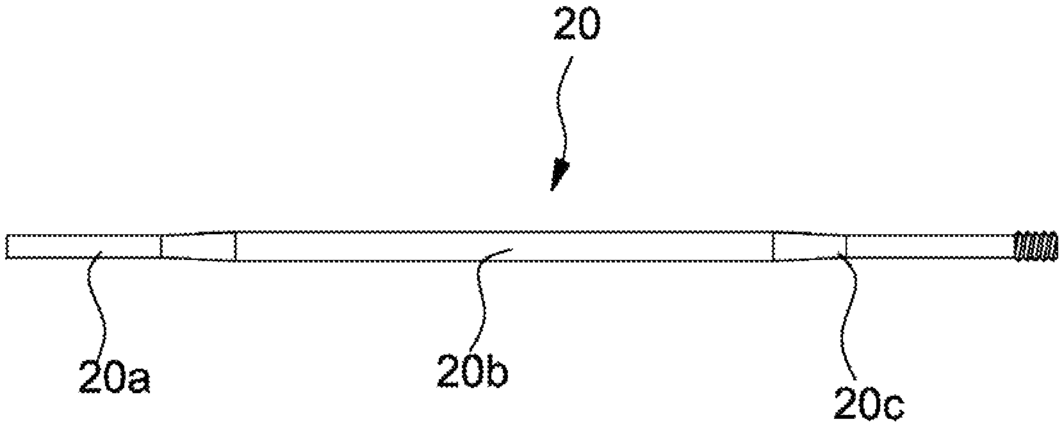
FIG. 5 is a front view showing an air flow control member applied to a panic bar with a door closer according to the present disclosure.

Then, as shown in FIG. 4, when the door is fully opened, the air flows through a circumference of the air inlet part 20*a* of the air flow control member 20, and thus the internal space of the air cylinder 11 may become at atmospheric pressure. In addition, as shown in FIG. 4, when the door is completely closed, the air inside the air cylinder 11 is continuously discharged to the outside through the circumference of the damping part 20*c* of the air flow control member 20, and thus, the inner space of the air cylinder 11 may become at atmospheric pressure.

Of course, movement of the piston may stop when air pressure between a front end surface of the piston and the inner surface of the air cylinder is greater than an elastic force of a spring while the door is closed, so, in order to prevent the door from not being closed, it is preferable for the pressure control valve 19 to be opened before the air pressure between the front end surface of the piston and the inner surface of the air cylinder is greater than the elastic force of the spring.

Meanwhile, in the above-described embodiment, the door may be opened at 90 degrees, but a case where the door is able to be opened at 180 degrees should be considered.

Then, one auxiliary link 16*a* as shown in FIGS. 6 to 11 or two auxiliary links 16*a* as shown in FIGS. 12 and 13 may be connected between the main link 16 and the piston rod 14*a*. However, although not shown in the drawings, a plurality of auxiliary links 16*a* more than the two auxiliary links 16*a* may be connected.

Figure 6:
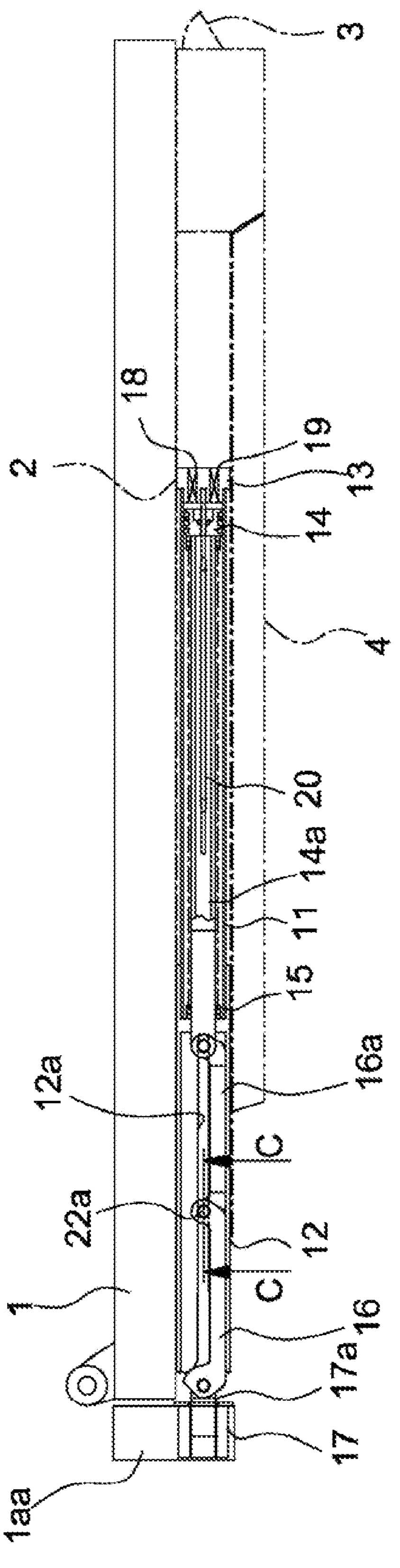
FIG. 6 is a cross-sectional view showing another example of a panic bar with a door closer according to the present disclosure.
Figure 7:
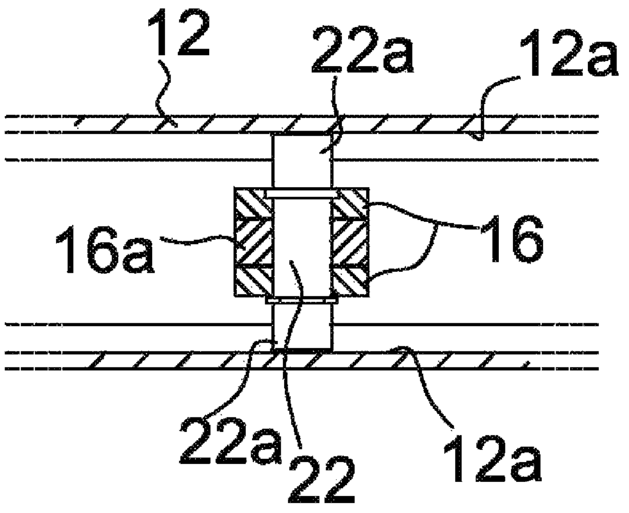
FIG. 7 is an enlarged cross-sectional view taken along line C-C of FIG. 6.

Also, as shown in FIGS. 6 and 7, a hinge protrusion 22*a* may be formed at the top or bottom of a hinge 22 located on both sides of an auxiliary link 16*a*, a linear guide groove 12*a* into which the hinge protrusion 22*a* are inserted may be formed in the guide member 12, and an angle of rotation between the main link 16 and the auxiliary link 16*a* and between auxiliary links, as well as between the main hinge 17*a* of the hinge assembly 17 and the main link 16 may be limited.

Of course, in order to limit a range of rotation of the main link and the auxiliary link, a locking stopper or protruding stopper may be formed in the center of rotation so that further rotation is not allowed at a certain angle.

In particular, in the present disclosure, the main link 16 and the auxiliary link 16*a* may be each formed in a U-shape, and an inner side of each of the main link 16 and the auxiliary link 16*a* may be installed toward the door 1. Due to this structure, it is possible to prevent a link from contacting a corner of the door or the like, which occurs in a structure of a straight link.

The panic bar with a door closer according to the present disclosure is operated as shown in FIGS. 6 and FIGS. 8 to 11, and may be operated in other embodiments in the same way. Thus, 180-degree rotation of the door will be described with one embodiment.

Figure 8:
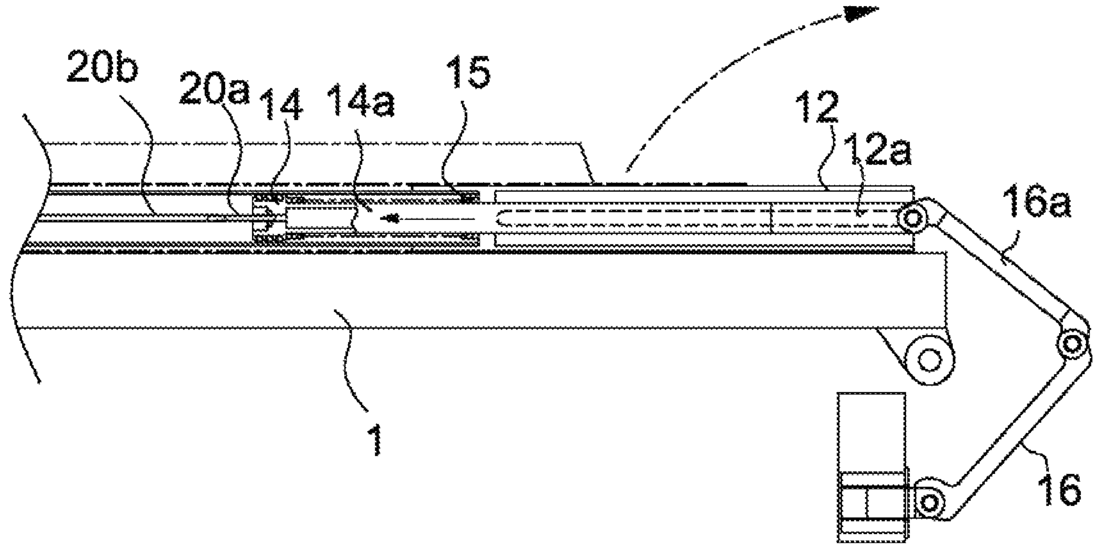
FIGS. 8, 9, 10, and 11 are cross-sectional views showing another example of a panic bar with a door closer according to the present disclosure.

FIG. 6 shows a state in which the door 1 is fully closed, and FIG. 8 shows a state in which the door 1 is fully opened at 180 degrees. In the state where the door 1 is fully opened, the spring 15 may be compressed between the guide member 12 and the piston 14, so that the piston 14 is moved by an elasticity force of the spring 15 unless the door 1 is held by an external force.

Figure 9:
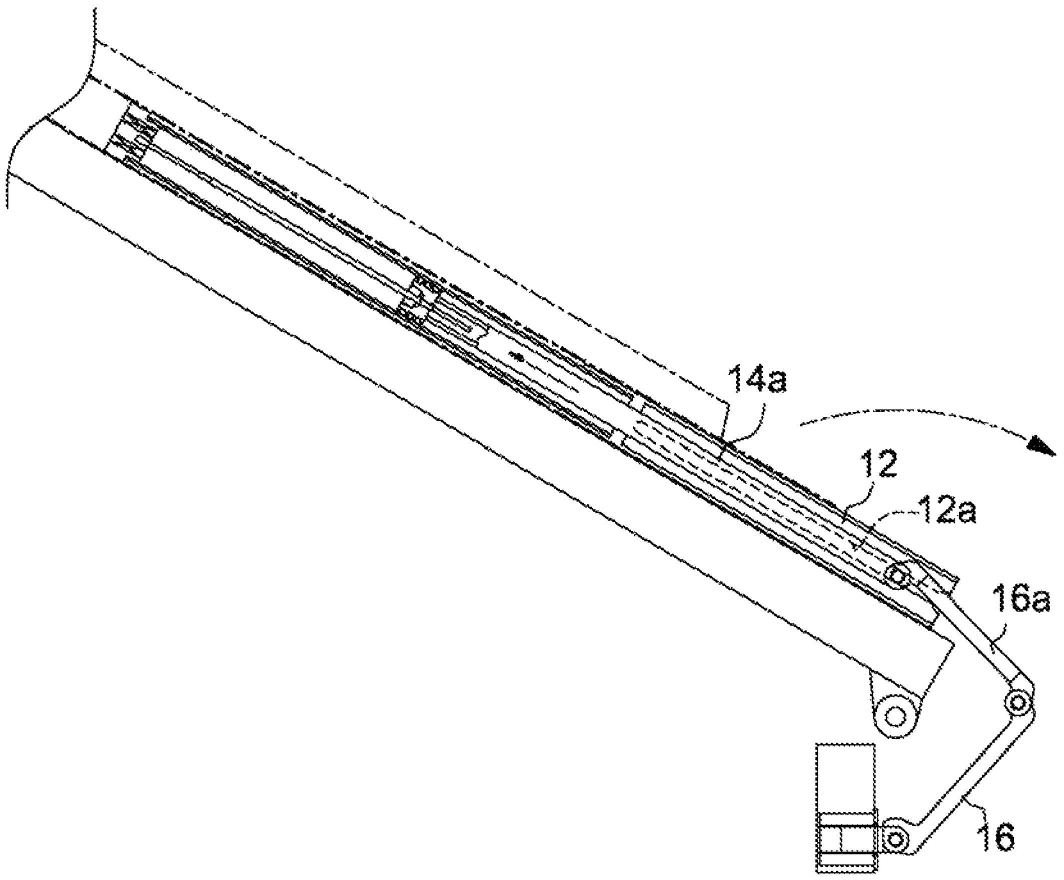

Then, as the piston 14 is moved, the piston rod 14*a*, the auxiliary link 16*a*, and the main link 16 are moved and rotated in a direction to close the door, as shown in FIG. 9, and as an angle between the auxiliary link 16*a* and the main link 16 increases, the auxiliary link 16*a* may be inserted into the guide member 12.

In this case, such movement is made with the seal 21 positioned in the air compression part 20*b* of the air flow control member 20, and thus, air is compressed in a space between a front end surface of the piston 14 and the inner surface of the air cylinder 11.

Figure 10:
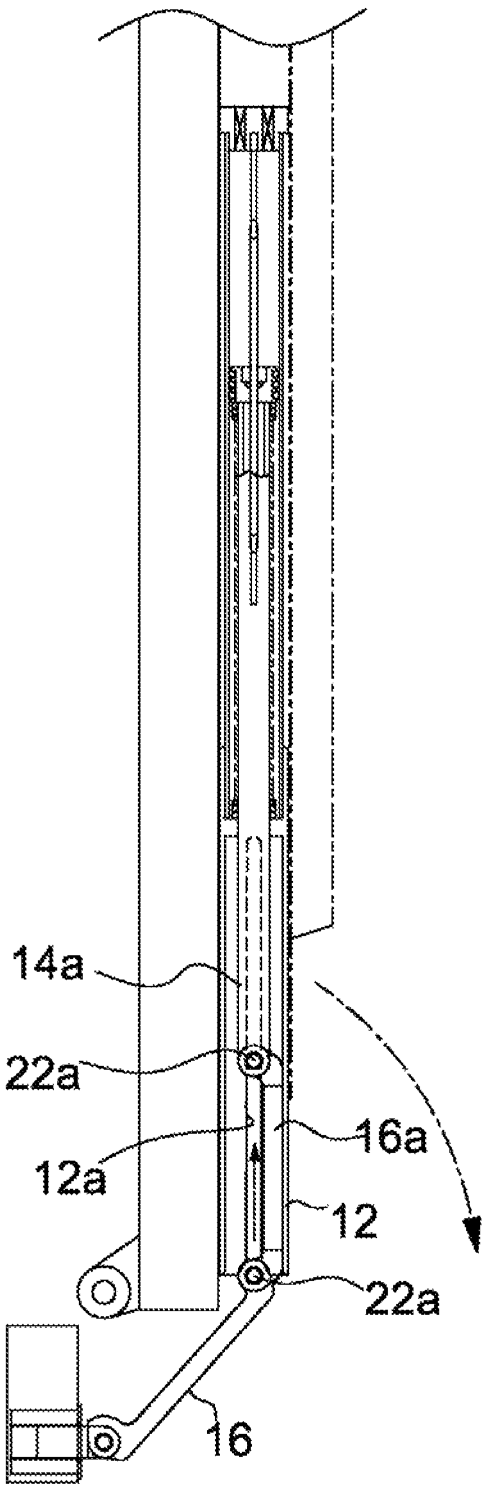

In addition, when the door 1 continues to be closed and hence an open angle reaches 90 degree, as shown in FIG. 10, the auxiliary link 16*a* may be positioned at the guide member 12 and the hinge protrusion 22*a* of the hinge 22 between the main link 16 and the auxiliary link 16*a* may be inserted into the guide groove 12*a* of the guide member 12, and as the door 1 further continues to be closed, the auxiliary link 16*a* is moved linearly within the guide member 12.

Of course, even in this case, since such movement is made with the seal 21 positioned in the compressor 20*b* of the air flow control member 20, air may be compressed in a space between the front end surface of the piston 14 and the inner surface of the air cylinder 11, reducing a closing force of the door 1 and thereby reducing a closing speed of the door 1.

Figure 11:
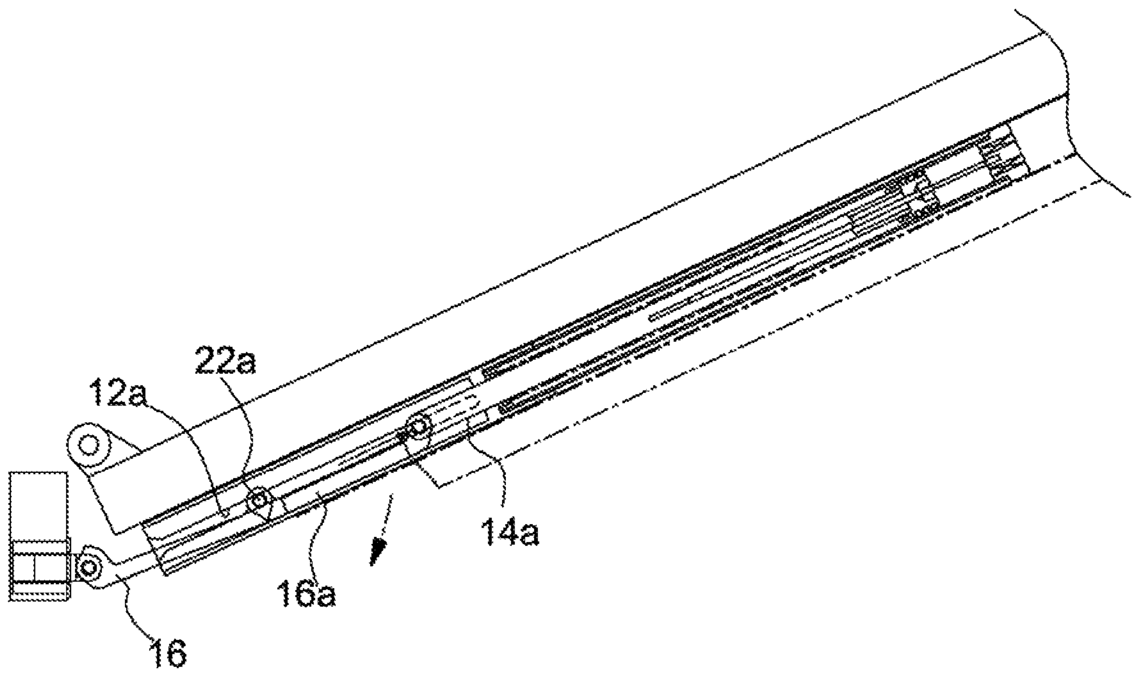

As the auxiliary link 16*a* is moved linearly within the guide member 12 and the door 1 continues to be closed, the main link 16 is inserted into the guide member 12 as shown in FIG. 11, and accordingly, the door 1 continues to be closed by an elastic force of the spring 15 and thereby fully closed as shown in FIG. 6.

Of course, in a state right before the door 1 is fully closed, that is, a state in which the door 1 is open at about 30 degrees, the seal 21 installed at the piston 14 may be positioned at the damping part 20*c* of the air flow control member 20 and the compressed air in the space between the front end surface of the piston 14 and the inner surface of the air cylinder 11 comes out to the outside, thereby causing the door 1 to be slowly closed.

As the door closes, a compressed air in the space between the front end surface of the piston 14 and the inner surface of the air cylinder 11 arises before the seal 21 reaches the damping part 20*c* of the air flow control member 20, and a case in which the force acting on the piston 14 by the pressure of the compressed air is greater than the elastic force of the spring 15 may occur. In preparation for this case, it is preferable to adjust the pressure control valve 19 to open at a certain air pressure or higher.

When the user pushes the push bar 4 of the panic bar, the locking device 3 may be released and hence the door 3 may be opened. As described above, the door 1 may be smoothly opened in the reverse order of the process of closing the door 1 as described above.

Here, when the door is opened by 180 degrees using one main link 16 and one auxiliary link 16*a*, a protruding degree of the two links 16 and 16*a* may be large. Thus, as shown in FIGS. 12 and 13, if two auxiliary links 16*a* and one main link 16 are used, it is possible to reduce the protruding degree of the links in a case where the door 1 is fully opened by 180 degrees. How the main link and the plurality of auxiliary links are operated are the same as described above, and thus, a detailed description of the embodiments of FIGS. 12 and 13 will be omitted.

As such, in the present disclosure, the door closer may be coupled to a location where the panic bar is installed, the door may be opened and closed more conveniently, and maintenance may be more convenient due to the position of the panic bar with the door close coupled thereto is positioned between the waist and chest of a human body.

The panic bar with a door closer according to the present disclosure has advantages that the door smoothly at 90 degrees may be opened smoothly in the case of using one main link connected to the piston rod and that an accident caused by protrusion of the main link during opening of the door may be easily prevented because the main link is rotated and comes close to each portion of the door when the door is opened.

In addition, since the front end of the auxiliary link goes straight within the guide member and rotates immediately after protruding into the guide member, the door can be rotated 180 degrees even if one auxiliary link is added while limiting the rotation angle of the main link. In addition, by limiting the rotation angles of the main link and the auxiliary links, a plurality of links can approach the center of rotation of the door.

Furthermore, the main link and the auxiliary link are each formed in a U-shape, and thus, even if a length of each of the links is formed longer than in the case where the links are in a straight shape, it is possible to avoid contact of each link with the door while the door is opened or closed, so that the door can be opened and closed smoothly. Accordingly, without a need to consider friction between the door and each link, a force to close the door may be maintained for a long time, and thus, a door closer function may be smoothly combined in the panic bar.

In particular, by applying a rod-shaped air flow control member of a simple structure, it is possible to realize air inflow, air compression, and an air pressure-based damping function in a space between the inside of the air cylinder and the front end surface of the piston.

What is claimed is:

1. A panic bar with a door closer, the panic bar having a locking device installed at a front end of a case and a door closer provided at a rear end of the case, wherein the locking device is released upon pushing of a push bar provided in the case, wherein an air cylinder is installed inside the case;

wherein a guide member is installed in one side of the air cylinder and a cylinder sealing cap is installed in the other side of the air cylinder;

wherein one side of a piston rod having a piston for compressing and expanding air inside the air cylinder passes through the guide member;

wherein a spring disposed between the piston and the guide member is installed on the piston rod;

wherein a main link hinge-coupled to one side of the piston rod is installed in the guide member;

wherein a hinge assembly having a main hinge hinge-coupled to the main link is inserted into and installed at a vertical bar of a door frame of a door;

wherein an inflow check valve for allowing external air to flow in one direction into the air cylinder is installed at the cylinder sealing cap; and wherein a pressure control valve for allowing air inside the air cylinder to flow to the outside when internal air pressure inside the air cylinder is at a predetermined pressure or higher is installed at the cylinder sealing cap.

2. The panic bar of claim 1, wherein the piston rod is hollow-shaped;

an air flow control member passing through a central portion of the piston to be positioned in a hollow portion of the piston rod is fixed to and installed at the cylinder sealing cap;

a seal is installed between an outer surface of the air flow control member and a through portion of the piston; and the air flow control member comes into close contact with an inner surface of the sealing according to an open angle of the door to block a flow of air, and also forms a gap with the inner surface of the seal so that air flows or air acting as a damping force flows to an outside through the hollow portion of the piston rod from an inside of the air cylinder.

3. The piston bar of claim 2, wherein:

an air inlet part is formed at a front end of the air flow control member so that air flows through the inside of the air cylinder between the inner surface of the seal and the air inlet part when the door is fully opened;

an air compression part to be brought into contact closely with the inner surface of the seal is formed in a middle of the air flow control member so as to block an air flow, flowing to the hollow portion of the piston rod, until the door is closed; and a damping part is formed at a rear end of the air flow control member so that air subtly flows between the seal and the damping part before the door is closed, thereby forming a damping force of the air.

4. The panic bar of claim 1, wherein:

one auxiliary link or a plurality of auxiliary links is connected between the main link and the piston rod;

a hinge protrusion is formed at the top or bottom of a hinge located on both sides of the auxiliary link; and a linear guide groove into which the hinge protrusion are inserted is formed in the guide member; and an angle of rotation between the main link and the auxiliary link and between auxiliary links, as well as between the main hinge of the hinge assembly and the main link is limited.

5. The panic bar of claim 4, wherein:

each of the main link and the auxiliary link is formed in a U-shape, and an inner side of each of the main link and the auxiliary link is installed toward the door.

* * * * *